May 11, 1937.    B. BERGGREN    2,080,161
AUTOMOBILE PROTECTING DEVICE
Filed Jan. 25, 1936

Inventor
Bernard Berggren
By Arthur H. Sturges
Attorney

Patented May 11, 1937

2,080,161

UNITED STATES PATENT OFFICE 2,080,161

AUTOMOBILE PROTECTING DEVICE

Bernard Berggren, Genoa, Nebr.

Application January 25, 1936, Serial No. 60,759

1 Claim. (Cl. 293—55)

This invention relates to automobile accessories and more particularly to a protecting device for automobile bodies.

It is an object of the invention to provide means for preventing road gravel and similar debris from striking against the rear portion of an automobile for the overall purpose of preventing marring and scratching of the paint and finish of the rear of an automobile, said means to be economical in manufacture and readily attached to substantially all of the conventional types of automobiles.

With the foregoing and other objects in view the invention will be more fully described hereinafter and more particularly pointed out in the claims appended hereto.

In the drawing wherein like symbols refer to like or corresponding parts throughout the several views.

Figure 1:
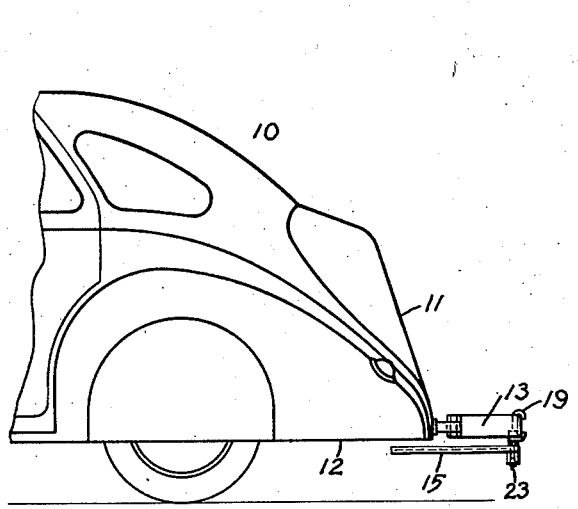
Figure 1 is a side elevation of a fragment of an automobile having an embodiment of the present invention applied thereto in a position of use.

Resultant from the recent employment of "stream line" designs for automobile bodies the rear lower edges of the latter have been projected further rearwardly from the rear wheels thereof than heretofore and the bumper bars for the rear ends of the modern or late type of said vehicles have also necessarily been positioned further rearwardly than heretofore and with the result that when said modern type of vehicles travel over graveled roads, incident to the rotation of the rear traction wheels, the latter throw gravel rearwardly of the vehicle and upwardly, striking the bumper bars which are transversely positioned with respect to said bodies, said gravel or debris being deflected by and caroming from said bumper bar and returned towards the body of the vehicle and striking the latter, whereby the sharp gravel and debris scratches the finish thereof and on certain types of graveled roads, dependent upon the looseness of the gravel and like conditions, said gravel ruins the paint and finish of said vehicles and it is an object of the invention to provide means for preventing the same.

Referring now to the drawing for a more particular description, 10 indicates generally an automobile having a rear wall 11, a bottom or lower edge 12 and a bumper bar 13 positioned outwardly from the rear wall 11, and in substantial alignment with the bottom 12 of said vehicle.

The bumpers 13 are supported from the frame of the vehicle and vary in contour, style and size. Some bumpers are rigid and others resilient, some bumper bars are straight and others arcuate, and it is a further object of the invention to provide means for achieving the purposes stated which is also of universal applicability to any type or shape of bumper and automobile, without regard to the size or contour of the bumpers.

Figure 4:
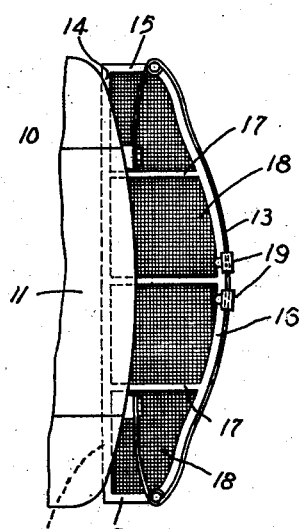
Figure 4 is a top plan view of a modification of the preferred embodiment of the invention applied to a fragment of an automobile body and the bumper of the latter.

Referring first to Figure 4, the invention includes an elongated frame having a straight side rail 14 disposed at a right angle with respect to the end rails 15 thereof and a side rail 16 of irregular shape in plan to conform to the shape of the bumper bar 13 in plan.

The frame may be provided, if desired, with reinforcing ribs 17. A foraminous screen 18 is supported by the frame and may be suitably attached thereto by any suitable means such as welding or the like. The screen 18 is of fine enough mesh to prevent passage therethrough of gravel, while permitting the passage of air therethrough.

Means are provided for supporting the described deflector transversely under said body and between the rear lower edge thereof and the bumper bar 13, said means preferably comprising adjustable cleats 19 secured to said frame and to said bar respectively.

In operation debris moved rearwardly by the traction wheels of the vehicle strikes the lower surface of the deflector and is deflected downwardly towards the road in a manner whereby the finish on the rear wall 11 of the vehicle is protected from contact with said debris.

Figure 2:
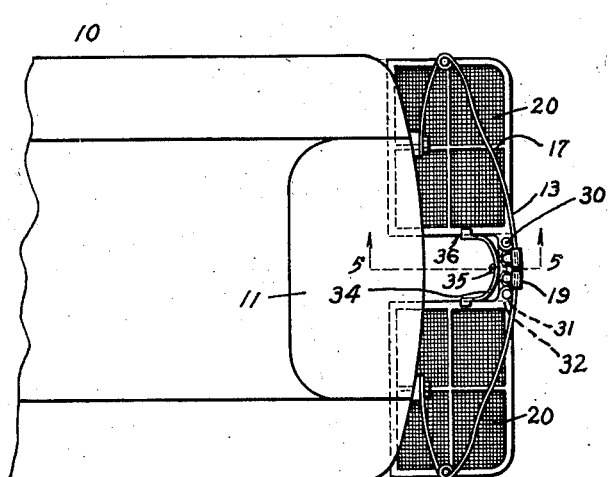
Figure 2 is a top plan view of the vehicle shown in Figure 1.

The modification, best shown in Figure 2, of the invention is adapted to function with a bumper bar of any contour in plan, straight or otherwise. The deflector or deflectors thereof being rectangular in plan including side and end frames disposed at a right angle with respect to each other and so arranged that they will give and swing toward the vehicle 10 in instances where the vehicle during a rearward traveling movement strikes against an object such as a tree or post, the arrangement being such that the deflector will swing under the bumper bar and permit the latter to perform its normal function at all times and without injury to said deflectors, said modification comprising an elongated frame 21 having oppositely disposed deflector portions 20 pivotally carried by said frame.

Figure 5:
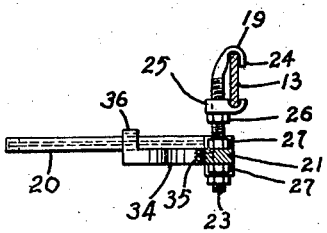
Figure 5 is a transverse section taken on line 5—5 of Figure 2.
Figure 3:
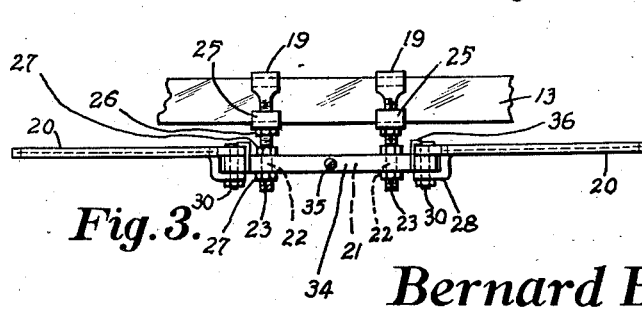
Figure 3 is an elevation of a fragment of an automobile bumper and showing the new device adjustably supported thereby.

Means for securing said frame to said body or more particularly the bumper bar 13 thereof is provided, said means preferably including two spaced apart apertures 22, indicated in Figure 3, for receiving the threaded shanks 23 of the cleats 19, the latter, as best shown in Figure 5, having fingers 24 for membering with the upper edge of the bumper bar 13 and adjustable lugs 25, each having a like finger oppositely disposed with respect to the fingers 24 for gripping the lower edge of the bumper bar 13. The lugs 25 encircle the shanks 23 and are slidable thereon, said shanks being each provided with a nut 26 which may be rotated for firmly clamping the shanks to the bumper bar 13.

The frame member 21 is also adjustable vertically and longitudinally of the shanks 23 by means of nuts 27 whereby the deflector portions and frame can be placed in parallelism with and below the lower edge 12 of the automobile without regard to the height of the bumper bar 13 with respect to said lower edge.

Figure 6:
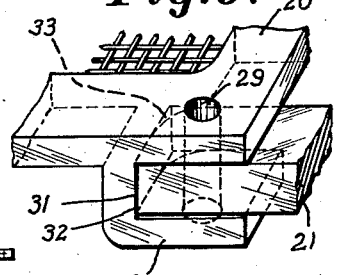
Figure 6 is a perspective view of a fragment of the device shown in Figure 2 and illustrating a detent employed.

The oppositely disposed deflector portions 20 are pivotally mounted on the member 21 and are each provided with an arm 28 having an aperture in alignment with a similar aperture 29 formed through a frame member of a deflector portion, as best shown in Figure 6, said apertures adapted to receive a pin or bolt 30 for permitting horizontal swinging movement of said deflector portions.

Referring to Figure 6, the end 31 of the member 21 is in parallelism and abutting relation with the wall 32 of the arm 28 at times when the deflector portions are in the position shown in Figure 2, the arrangement being such that said portions are prevented from swinging away from the automobile on their pivots, said abutting relation providing a detent for said purpose. The corners 33 of the member 21 are slightly arcuate for permitting swinging movement of the deflector portions 20 towards the automobile.

Resilient means are provided for maintaining or returning the deflectors to a normal position, said means preferably consisting of a spring 34 secured to the member 21 by means of a screw 35 and having opposite ends which bear against the deflector portions 20. Preferably the ends of the spring 34 are provided with fingers 36 which are slidable upon the upper edge of the frames of said portions 20, said spring urging said frames to a normal position at all times and at times when a deflector portion contacts with an obstacle during rearward travel of the vehicle, the urge of the spring 34 is overcome thereby and the deflector portions permitted to fold or swing under the bumper bar without injury to the parts.

During road traveling movements of the vehicle 10, the deflector portions 20 function for protecting the finish of the vehicle the same as heretofore described relative to the modification shown in Figure 4.

As thus described it will be understood that if desired one-piece-deflectors such as shown in Figure 4 may be provided having a contour in plan conforming to the shape of various bumper bars whereby no portion of the deflectors projects rearwardly of said bars and, if desired, in order to obviate the necessity of a dealer carrying a large assortment of shapes in stock, the modification shown in Figure 2 may be manufactured for interchangeable use in conjunction with various shapes of bumper bars. The foraminous screen provides a deflector for gravel and the like debris while permitting air to pass therethrough in a manner which does not impede traveling movements of the vehicle.

It is obvious that various changes and modifications may be made in the details of construction and design of the above specifically described embodiment of this invention without departing from the spirit thereof, such changes and modifications being restricted only by the scope of the claim.

I claim:—

A protecting device for an automobile body provided with a bumper comprising an elongated frame having oppositely disposed deflector portions pivotally carried thereby, means for securing said frame to said body for disposing said deflectors transversely under said body and outwardly from the rear lower edge thereof, said deflectors adapted to swing horizontally under the bumper of said automobile on their said pivots, detent means for limiting swinging movements of said deflectors away from said body, and resilient means for returning said deflectors to a normal position of alignment with respect to each other after an inward swinging movement.

BERNARD BERGGREN.